(12) United States Patent
Swick et al.

(10) Patent No.: US 7,344,465 B2
(45) Date of Patent: Mar. 18, 2008

(54) DRIVE SYSTEM FOR A MACHINE

(75) Inventors: William Christopher Swick, Raleigh, NC (US); Jerry Dwight Marr, Apex, NC (US); Friedrich Konrad Diecke, Holly Springs, NC (US)

(73) Assignee: Caterpillar Inc., Peoria, IL (US)

( * ) Notice: Subject to any disclaimer, the term of this patent is extended or adjusted under 35 U.S.C. 154(b) by 233 days.

(21) Appl. No.: 11/191,027

(22) Filed: Jul. 28, 2005

(65) Prior Publication Data

US 2007/0026989 A1 Feb. 1, 2007

(51) Int. Cl.
*F16H 47/10* (2006.01)

(52) U.S. Cl. .............................. 475/31; 475/73; 475/80

(58) Field of Classification Search .................... 475/1, 475/18, 21, 23, 27, 31, 73, 80, 32
See application file for complete search history.

(56) References Cited

U.S. PATENT DOCUMENTS

| 2,366,646 A | * | 1/1945 | Palmer ........................... 475/8 |
| 2,941,365 A | * | 6/1960 | Hann et al. .................... 60/423 |
| 3,752,013 A | | 8/1973 | Cross |
| 3,984,978 A | * | 10/1976 | Alderson ....................... 60/422 |
| 4,189,920 A | * | 2/1980 | Dezelan ........................ 60/420 |
| 4,261,226 A | | 4/1981 | Orshansky, Jr., deceased et al. |
| 4,286,477 A | | 9/1981 | Meyerle et al. |
| 4,341,132 A | | 7/1982 | Burdick |
| 4,363,247 A | | 12/1982 | Weseloh |
| 4,434,680 A | | 3/1984 | Riediger et al. |
| 4,896,563 A | | 1/1990 | Manor et al. |
| 5,052,987 A | | 10/1991 | Hagin et al. |
| 5,211,610 A | * | 5/1993 | Hurth ............................ 475/1 |
| 5,509,491 A | | 4/1996 | Hall, III |
| 5,512,021 A | | 4/1996 | Shash |
| 5,512,022 A | * | 4/1996 | Suzuki .......................... 475/2 |
| 5,518,461 A | * | 5/1996 | Pfordt .......................... 475/72 |
| 5,535,840 A | | 7/1996 | Ishino et al. |
| 5,931,757 A | | 8/1999 | Schmidt |
| 5,971,880 A | | 10/1999 | Keiser |
| 6,276,134 B1 | * | 8/2001 | Matsuyama et al. .......... 60/425 |
| 6,283,883 B1 | | 9/2001 | Hammarstrand |
| 6,491,599 B1 | | 12/2002 | Schmidt |
| 2002/0134559 A1 | * | 9/2002 | Newnam ..................... 172/817 |
| 2003/0119620 A1 | | 6/2003 | Zwilling et al. |

FOREIGN PATENT DOCUMENTS

JP 60116565 6/1985

OTHER PUBLICATIONS

Caterpillar Inc., Hydrostatic System Operation, Oct. 9, 2001, pp. 3-21.
Hydrostatic Drive Configurations, date unknown, 1 page.

* cited by examiner

*Primary Examiner*—Sherry Estremsky
(74) *Attorney, Agent, or Firm*—Finnegan, Henderson, Farabow, Garrett & Dunner

(57) ABSTRACT

A machine, including a hydraulic pump and one or more hydraulic implements connected to the hydraulic pump. The machine may also include a hydraulic motor connected to the hydraulic pump and one or more propulsion devices. Additionally, the machine may include drive-system controls operable to selectively cause the hydraulic motor to supply power to one or more of the propulsion devices.

22 Claims, 1 Drawing Sheet

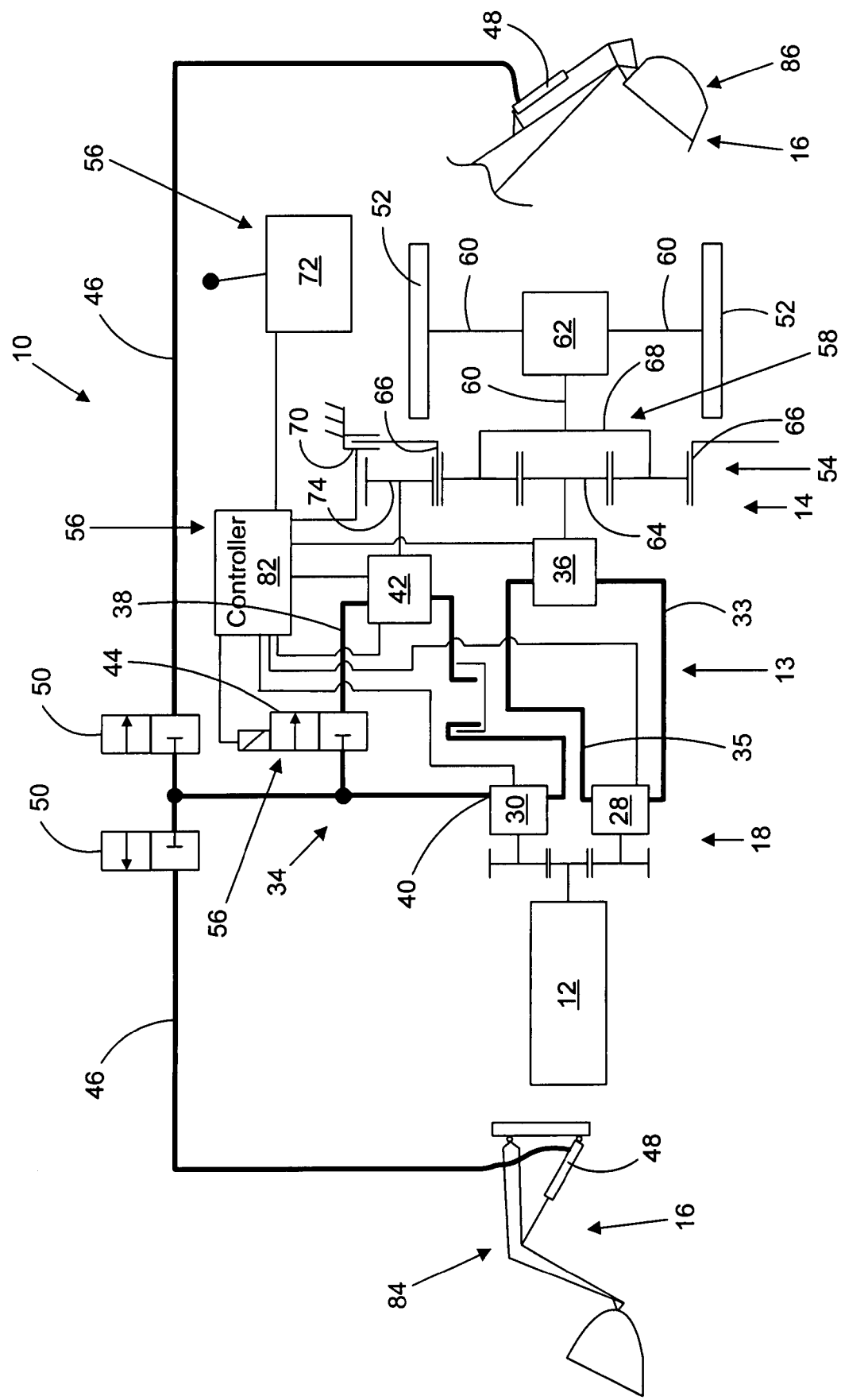

US 7,344,465 B2

DRIVE SYSTEM FOR A MACHINE

TECHNICAL FIELD

The present disclosure relates to drive systems of machines and, more particularly, to drive systems including a drive motor.

BACKGROUND

Machines, such as wheel loaders, off-highway trucks and other heavy construction and mining machines, are used to perform many tasks. To effectively perform these tasks, a machine requires a prime mover such as a diesel engine, a gasoline engine, a natural gas engine, a turbine engine or any other type of prime mover that provides the power required to complete these tasks. Some machines include a drive system with a drive motor for powering one or more propulsion devices to propel the machine. Unfortunately, utilizing a single drive motor to propel such a machine may prove inefficient under some circumstances, as various operating conditions may require widely-varying operating speeds and power outputs of the drive motor.

U.S. Pat. No. 4,896,563 ("the '563 patent") shows a power transmission system with two hydraulic motors and a method of operation that includes operating different combinations of one or both of the motors. The power transmission system of the '563 patent further includes a hydraulic pump for providing power to the hydraulic motors and a planetary gear unit drivingly connected to the hydraulic motors. A first hydraulic motor is drivingly connected to a planet gear carrier of the planetary gear unit, and a second hydraulic motor is drivingly connected to a ring gear of the planetary gear unit.

The '563 patent discloses locking the planet gear carrier to the ring gear, while driving the planet gear carrier with the first hydraulic motor and driving the ring gear with the second hydraulic motor, to drive the sun gear at a first speed. The '563 patent further discloses unlocking the planet gear carrier from the ring gear, deactivating the first hydraulic motor, holding the planet gear carrier stationary, and driving the ring gear with the second hydraulic motor, to drive the sun gear at a second speed, higher than the first. The only use that the '563 patent discloses for the hydraulic pump is supplying the hydraulic motors.

Although the power transmission system of the '563 patent includes multiple hydraulic motors, certain disadvantages persist. For example, by utilizing the hydraulic pump only to supply the hydraulic motors of the power-transmission system, the design fails to capitalize on the hydraulic pump as a potential source of power for other components. Additionally, utilizing only the second hydraulic motor to provide power for high-speed propulsion fails to exploit the power capacity of the first hydraulic motor when power needs may be highest.

The drive system of the present disclosure solves one or more of the problems set forth above.

SUMMARY OF THE INVENTION

One disclosed embodiment includes a machine, which may include a hydraulic pump and one or more hydraulic implements connected to the hydraulic pump. The machine may also include a hydraulic motor connected to the hydraulic pump and one or more propulsion devices. Additionally, the machine may include drive-system controls operable to selectively cause the hydraulic motor to supply power to one or more of the propulsion devices.

Another aspect of the present disclosure is directed to a method of operating a machine. The method may include transmitting power to one or more of the propulsion devices of the machine, which may include selectively operating a hydraulic motor with fluid from a hydraulic pump, and transmitting power produced by the hydraulic motor to one or more of the propulsion devices. Additionally, the method may include selectively supplying fluid from the hydraulic pump to one or more hydraulic implements of the machine.

A further aspect of the present disclosure relates to a machine, which may include a first motor, a second motor, a propulsion device, and drive-system controls. The drive-system controls may be configured to execute a control method, including selectively operating in a low-speed-propulsion mode, wherein the first motor, but not the second motor, supplies power to the propulsion device and drives the propulsion device at a first speed. Additionally, the control method may include selectively operating in a high-speed-propulsion mode, wherein the first motor and the second motor both supply power to the propulsion device and drive the propulsion device at a second speed, higher than the first speed, including during straight-line propulsion of the machine.

BRIEF DESCRIPTION OF THE DRAWINGS

The figure is a schematic illustration of one embodiment of a machine according to the present disclosure.

DETAILED DESCRIPTION

The figure is a schematic illustration of one embodiment of a machine 10. Machine 10 may include a prime mover 12, a power-conversion system 18, a power-distribution system 13, a drive system 14, and one or more hydraulic implements 16. Prime mover 12 may be any type of machine component configured to provide power for machine 10. Prime mover 12 may include machine components such as a diesel engine, a gasoline engine, a natural gas engine, a turbine engine, a fuel cell, or a battery.

Power-conversion system 18 may be configured to convert at least a portion of the power produced by prime mover 12 into one or more forms useable by various power-consuming devices of machine 10. For example, power-conversion system 18 may include hydraulic pumps 28, 30 drivingly connected to prime mover 12 and configured to pump fluid for use by hydraulic actuators and/or motors of machine 10. In addition to, or in place of, hydraulic pumps 28, 30, power-conversion system 18 may include one or more electric generators (not shown) drivingly connected to prime mover 12 and configured to generate electricity for use by electric actuators and/or motors of machine 10.

Power-distribution system 13 may be configured to distribute power from power-conversion system 18 to various power-consuming devices of machine 10. Power-distribution system 13 may include a closed, fluid-transfer circuit, including a supply channel 33 and a return channel 35 connecting hydraulic pump 28 and drive motor 36. Power-distribution system 13 may also include a fluid-distribution network 34 with various channels for directing fluid from hydraulic pump 30 to various hydraulic actuators and/or motors of machine 10. Fluid-distribution network 34 may include a motor-supply channel 38 connected between an outlet port 40 of hydraulic pump 30 and a drive motor 42. Fluid-distribution network 34 may include a motor-supply valve 44 for selectively allowing fluid to flow from outlet port 40 to motor-supply channel 38. Additionally, one or more implement-supply channels 46 may be connected between outlet port 40 and hydraulic drivers 48 of hydraulic implements 16. One or more implement-supply valves 50 may be operable to selectively allow fluid to flow from outlet port 40 to one or more of implement-supply channels 46.

Power-distribution system 13 is not limited to the embodiment illustrated in the figure. For example, power-distribution system 13 may omit one or more of the channels and valves shown in the figure and/or include channels, valves, or other components not shown in the figure. In some embodiments, power-distribution system 13 may include electrical circuits for transmitting electricity from electric generators of power-conversion system 18 to electricity-consuming devices, such as electric drive motors, of machine 10.

Drive system 14 may be configured to receive power from prime mover 12 and/or power-distribution system 13 and utilize that power to propel machine 10 along the ground. Drive system 14 may include drive motors 36, 42, one or more propulsion devices 52, a drive train 54, and drive-system controls 56. Drive motors 36, 42 may be fixed-displacement or variable-displacement hydraulic motors. Propulsion devices 52 may be any type of device configured to receive power and transmit that power to the ground to propel machine 10. For example, propulsion devices 52 may be wheels or track units.

Drive train 54 may include a transmission unit 58, drive shafts 60, and a differential unit 62 connected between drive motors 36, 42 and propulsion devices 52. Transmission unit 58 may include a rotary member 64 drivingly connected to drive motor 36, a rotary member 66 drivingly connected to drive motor 42 through a pinion gear 74, and a rotary member 68 drivingly connected to propulsion devices 52 through drive shafts 60 and differential unit 62. Rotary members 64, 66, and 68 may be drivingly connected to one another in such a manner that their respective directions and speeds of rotation are interdependent. As is shown in the figure, transmission unit 58 may be a planetary gear set, and rotary members 64, 66, and 68 may be a sun gear, a ring gear, and a planet gear carrier, respectively. Transmission unit 58 may further include a braking device 70 for preventing rotation of rotary member 66 in at least one direction. Braking device 70 may be a selectively engageable two-way brake, such as the selectively-engageable friction brake shown in the figure, which, when engaged, holds rotary member 66 against any rotation. Alternatively, braking device 70 may be a one-way brake, such as a dog clutch or a ratchet, configured to prevent rotation of rotary member 66 in only one direction.

Drive-system controls 56 may include an operator interface 72, motor-supply valve 44, and a controller 82. Operator interface 72 may be configured to transmit operator inputs related to a desired direction, speed, and/or trajectory of propulsion of machine 10 to other components of drive-system controls 56, such as controller 82. Controller 82 may include one or more processors (not shown) and one or more memory devices (not shown). Controller 82 may be dedicated to controlling operation of drive system 14, or controller 82 may be configured to monitor and/or control components of machine 10 other than those of drive system 14. Controller 82 may be operatively connected to motor-supply valve 44, hydraulic pumps 28, 30, and drive motors 36, 42 so as to allow controller 82 to control various aspects of the operation of these components.

Drive system 14 is not limited to the embodiment illustrated in the figure. For example, in some embodiments, drive system 14 may omit drive motor 36, and another power source, such as prime mover 12, may be drivingly connected to rotary member 64. Additionally, drive motors 36, 42 may be other types of motors, such electric motors. Furthermore, in embodiments wherein transmission unit 58 is a planetary gear set, each drive motor 36, 42 may be drivingly connected to any one of the sun gear, ring gear, and planet gear carrier, thereof. Moreover, in some embodiments, transmission unit 58 may omit braking device 70. Additionally, in some embodiments, transmission unit 58 may be of a type other than a planetary gear set, such as a differential unit.

Furthermore, drive system 14 may omit one or more of the components shown in the figure and/or include additional components not shown in the figure. For example, drive system 14 may omit one or more of transmission unit 58, drive shafts 60, and differential unit 62. Additionally, drive system 14 may include additional power-transfer components, such as shafts, gears, pulleys, belts, sprockets, chains, and flexible couplers drivingly connected between drive motors 36, 42 and propulsion devices 52. Furthermore, while the figure shows two propulsion devices 52 drivingly connected to drive train 54, fewer or more propulsion devices 52 may be drivingly connected to drive train 54. Moreover, drive system 14 may include additional drive motors drivingly connected to drive train 54. Drive system 14 may also include additional drive motors and propulsion devices drivingly connected to one another, but not drivingly connected to drive motors 36, 42, drive train 54, or propulsion devices 52.

Moreover, drive-system controls 56 may omit one or more of the components shown in the figure and/or include other components not shown in the figure. For example, drive-system controls 56 may include hardwired logic circuitry, mechanical, hydraulic, pneumatic, and/or optical logic devices in addition to, or in place of controller 82. Furthermore, drive-system controls 56 may include one or more other controllers in addition to controller 82, and the control logic of drive-system controls 56 may be distributed between controller 82 and such other controllers.

Hydraulic implements 16 may be any type of device configured to utilize power from pressurized fluid to perform one or more tasks of machine 10. Hydraulic implements 16 may include devices such as, for example, a loader 84, an excavator 86, machine stabilizers (not shown), hoists (not shown), and rotary brooms (not shown). Hydraulic drivers 48 of hydraulic implements 16 may be configured to receive pressurized fluid from implement-supply channels 46 and drive other components of hydraulic implements 16. While the hydraulic drivers 48 shown in the figure are hydraulic cylinders, hydraulic drivers 48 of hydraulic implements 16 may include any type of device configured to utilize power from pressurized fluid to move another component of machine 10.

INDUSTRIAL APPLICABILITY

Drive system 14 of the disclosed embodiments has potential application in any machine 10 requiring propulsion. The operation of a machine 10 with a drive system 14 according to this disclosure is described below.

Prime mover 12, power-conversion system 18, and power-distribution system 13 may provide power for various systems of machine 10, such as drive system 14 and hydraulic implements 16. Prime mover 12 may produce power and transmit that power to power-conversion system 18, such as by driving hydraulic pumps 28, 30. Power-conversion system 18 may convert the power received from prime mover 12 into a different form, such as by hydraulic pumps 28, 30 utilizing power from prime mover 12 to pump fluid to power-distribution system 13. Power-distribution system 13 may transmit power from power-conversion system 18 to drive system 14 and hydraulic implements 16 by directing fluid from hydraulic pumps 28, 30 to drive motors 36, 42 and hydraulic drivers 48.

Drive motors 36, 42 may utilize power received from power-distribution system 13 to propel machine 10. When supplied with a flow of fluid from hydraulic pumps 28, 30, drive motors 36, 42 may utilize power from that fluid to drive rotary members 64, 66. Rotary members 64, 66 may, in turn, drive rotary member 68. Rotary member 68 may transmit power to propulsion devices 52 through drive shafts 60 and differential unit 62. When one or both of drive motors 36, 42 are transmitting power to propulsion devices 52 through drive train 54, propulsion devices 52 may tend to propel machine 10 in a straight line. Machine 10 may include a steering system (not shown) for causing machine 10 to turn during propulsion, rather than traveling along a straight line.

Drive-system controls 56 may control operation of drive motors 36, 42 dependent upon various conditions of operation of machine 10. Controller 82 may control whether drive motor 42 drives rotary member 66 by utilizing motor-supply valve 44 to selectively allow fluid to flow from hydraulic pump 30 to hydraulic motor 42. Similarly, controller 82 may control whether and at what speed drive motor 36 drives rotary member 64 by controlling the displacement of hydraulic pump 28, the displacement of drive motor 36, the speed at which hydraulic pump 28 is driven, and/or other aspects of operation of machine 10. Furthermore, controller 82 may control the operating speed of drive motor 42 by controlling the flow rate of fluid from hydraulic pump 30 to hydraulic motor 42, the displacement of hydraulic motor 42, and/or other aspects of operation of machine 10.

In some embodiments, drive-system controls 56 may selectively operate in a low-speed-propulsion mode or a high-speed-propulsion mode. In low-speed-propulsion mode, drive-system controls 56 may cause drive motor 36, or any alternative power source drivingly engaged to rotary member 64, to drive rotary member 64. Simultaneously, drive-system controls 56 may prevent operation of drive motor 42, such as by closing motor-supply valve 44. In the embodiment illustrated in the figure, when drive motor 36 is driving rotary member 64, reaction torque in transmission unit 58 may tend to rotate rotary member 66 in a direction opposite the direction of rotation of rotary member 64. With motor-supply valve 44 closed, drive motor 42 may be locked against rotation and, thus, hold rotary member 66 against such rotation. Additionally, in embodiments where transmission unit 58 includes braking device 70, controller 82 may cause braking device 70 to assist drive motor 42 in holding rotary member 66 against rotation. With drive motor 36 driving rotary member 64 and braking device 70 holding rotary member 66 against rotation, rotary member 68 is driven at a fixed ratio with respect to drive motor 36. In low-speed-propulsion mode drive-system controls 56 may vary the speed of propulsion by varying the speed of drive motor 42.

In high-speed-propulsion mode, drive-system controls 56 may cause drive motor 36, or an alternative power source, to drive rotary member 64, while simultaneously causing drive motor 42 to drive rotary member 66 in a same direction.

When rotary members 64 and 66 are driven in the same direction, rotary member 68 is driven at a higher ratio with respect to drive motor 36 than when rotary member 64 is driven and rotary member 66 is held stationary. Thus, for a given range of operating speeds of drive motor 36, machine 10 may achieve higher propulsion speeds when operating in high-speed-propulsion mode than when operating in low-speed-propulsion mode. Operating both drive motors 36, 42 when propelling machine at higher speeds, which typically requires more power than when propelling machine 10 at lower speeds, capitalizes on the full power capacity of drive motors 36, 42. In some embodiments, drive-system controls 56 may operate in high-speed-propulsion mode both during straight-line propulsion of machine 10 and during activation of a steering system (not shown) to turn machine 10.

While drive system 14 is propelling machine 10, or while machine 10 is stationary, an operator may utilize hydraulic implements 16 to perform various tasks. For example, an operator may utilize loader 84 to lift objects and/or excavator 86 to dig. An operator may control hydraulic implements 16 by utilizing implement-supply valves 50 to selectively allow fluid to flow from hydraulic pump 30 to hydraulic drivers 48, which may utilize power from the fluid to power various components of hydraulic implements 16. Utilizing fluid from hydraulic pump 30 to power hydraulic implements 16, in addition to drive motor 42, is a cost-effective way to provide power for both hydraulic motor 42 and implements 16. Additionally, providing power to drive motor 42 with hydraulic pump 30 during high-speed propulsion may have limited impact on use of hydraulic implements 16 by an operator, as operators typically engage in limited use of hydraulic implements 16 during high-speed propulsion of machine 10.

It will be apparent to those skilled in the art that various modifications and variations can be made in the disclosed machine 10 and drive system 14 without departing from the scope of the disclosure. Other embodiments of the disclosed machine 10 and drive system 14 will be apparent to those skilled in the art from consideration of the specification and practice of the drive systems disclosed herein. It is intended that the specification and examples be considered as exemplary only, with a true scope of the disclosure being indicated by the following claims and their equivalents.

What is claimed is:

1. A machine, comprising:
    a first hydraulic pump;
    one or more hydraulic implements connected to the first hydraulic pump;
    a first hydraulic motor connected to the first hydraulic pump;
    a second hydraulic pump;
    a second hydraulic motor connected to the second hydraulic pump;
    one or more propulsion devices; and
    drive-system controls operable to selectively cause the first hydraulic motor to supply power to one or more of the propulsion devices and to selectively cause the second hydraulic motor to supply power to one or more of the propulsion devices.

2. The machine of claims 1, wherein one or more propulsion devices of the machine are drivingly connected to both the first hydraulic motor and the second hydraulic motor.

3. The machine of claims 1, wherein the drive system controls are configured to execute a control method, including:

selectively operating in a first mode, including causing the second hydraulic motor, but not the first hydraulic motor, to transmit power to one or more of the propulsion devices of the machine; and selectively operating in a second mode, including causing both the first hydraulic motor and the second hydraulic motor to transmit power to one or more of the propulsion devices.

4. The machine of claim 3, further including:
a transmission unit, including a first rotary member drivingly connected to the first hydraulic motor, a second rotary member drivingly connected to the second hydraulic motor, and a third rotary member drivingly connected to one or more of the propulsion devices.

5. The machine of claim 4, wherein the transmission unit includes a planetary gear set.

6. The machine of claim 3, wherein operating in the first mode includes causing the first hydraulic pump to provide fluid to the one or more hydraulic implements.

7. The machine of claim 1, further including:
a transmission unit, including a first rotary member drivingly connected to the first hydraulic motor, a second rotary member drivingly connected to the second hydraulic motor, and a third rotary member drivingly connected to one or more of the propulsion devices.

8. The machine of claim 7, wherein the transmission unit is constructed in such a manner that the direction and speed of rotation of the first, second, and third rotary members are interdependent.

9. The machine of claim 1, wherein:
the first hydraulic pump and the first hydraulic motor are connected to one another in an open-loop manner; and
the second hydraulic pump and the second hydraulic motor are connected to one another in a closed-loop manner.

10. A method of operating a machine, comprising:
transmitting power to one or more propulsion devices of the machine, including selectively operating a first hydraulic motor with fluid from a first hydraulic pump, and transmitting power produced by the first hydraulic motor to one or more of the propulsion devices of the machine, and selectively operating a second hydraulic motor with fluid from a second hydraulic pump, and transmitting power produced by the second hydraulic motor to one or more of the propulsion devices; and
selectively supplying fluid from the first hydraulic pump to one or more hydraulic implements of the machine.

11. The method of claim 10, wherein transmitting power to one or more of the propulsion devices of the machine includes:
operating in a first mode, including transmitting power from the second hydraulic motor, but not the first hydraulic motor, to one or more of the propulsion devices of the machine; and
operating in a second mode, including transmitting power from both the first hydraulic motor and the second hydraulic motor to one or more of the propulsion devices.

12. The method of claim 10, wherein transmitting power to one or more of the propulsion devices of the machine includes:
operating in a low-speed-propulsion mode, including transmitting power from the second, but not the first hydraulic motor to one or more propulsion devices of the machine and driving those propulsion devices at a first speed; and operating in a high-speed-propulsion mode, including transmitting power from both the first hydraulic motor and the second hydraulic motor to one or more of the propulsion devices of the machine and driving those propulsion devices at a second speed, higher than the first speed.

13. The method of claim 10, wherein:
transmitting power from the first hydraulic motor to one or more of the propulsion devices includes transmitting power from the hydraulic motor to a first rotary member of a transmission unit; and
transmitting power from the second hydraulic motor to one or more of the propulsion devices includes transmitting power from the second power source to a second rotary member of the transmission unit.

14. The method of claim 10, wherein transmitting power to one or more of the propulsion devices of the machine includes transmitting power from the first hydraulic motor during straight-line propulsion of the machine.

15. A machine, comprising:
a first hydraulic motor;
a second hydraulic motor;
a propulsion device;
drive-system controls configured to execute a control method, including:
selectively operating in a low-speed-propulsion mode, wherein the first hydraulic motor, but not the second hydraulic motor, supplies power to the propulsion device and drives the propulsion device at a first speed;
selectively operating in a high-speed-propulsion mode, wherein the first hydraulic motor and the second hydraulic motor both supply power to the propulsion device and drive the propulsion device at a second speed, higher than the first, including during straight-line propulsion of the machine, wherein the high-speed-propulsion mode provides the highest propulsion speed range of the machine.

16. The machine of claim 15, further including:
a transmission unit with a first rotary member drivingly connected to the first hydraulic motor, a second rotary member drivingly connected to the second hydraulic motor, and a third rotary member drivingly connected to the propulsion device.

17. The machine of claim 16, wherein:
operating in the low-speed-propulsion mode includes causing the first hydraulic motor to drive the first rotary member, while holding the second rotary member stationary; and
operating in the high-speed-propulsion mode includes causing the first hydraulic motor to drive the first rotary member, while causing the second hydraulic motor to drive the second rotary member.

18. The machine of claim 16, wherein the transmission unit includes a planetary gear set.

19. The machine of claim 16, further including:
a hydraulic pump;
one or more hydraulic implements connected to the hydraulic pump; and
wherein the second hydraulic motor is connected to the hydraulic pump.

20. The machine of claim 15, further including:
a first hydraulic pump;
one or more hydraulic implements connected to the first hydraulic pump; and
wherein the second hydraulic motor is connected to the first hydraulic pump.

21. The machine of claim 15, further including:
a first hydraulic pump connected to the first hydraulic motor; and
a second hydraulic pump connected to the second hydraulic motor.

22. The machine of claim 15, further including a transmission drivingly connecting the first hydraulic motor and the second hydraulic motor to the propulsion device in a manner such that the speed of the first hydraulic motor, the speed of the second hydraulic motor, and the speed of the propulsion device are interdependent.

* * * * *